United States Patent
Bouldin et al.

(10) Patent No.: US 10,808,928 B2
(45) Date of Patent: Oct. 20, 2020

(54) BOSS FOR COMBUSTOR PANEL

(71) Applicant: UNITED TECHNOLOGIES CORPORATION, Hartford, CT (US)

(72) Inventors: Lee Edward Bouldin, Manchester, CT (US); Monica Pacheco-Tougas, Waltham, MA (US); Dennis M. Moura, South Windsor, CT (US); Jonathan Jeffery Eastwood, Newington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 932 days.

(21) Appl. No.: 14/912,175

(22) PCT Filed: Aug. 6, 2014

(86) PCT No.: PCT/US2014/049845
§ 371 (c)(1),
(2) Date: Feb. 16, 2016

(87) PCT Pub. No.: WO2015/038259
PCT Pub. Date: Mar. 19, 2015

(65) Prior Publication Data
US 2016/0186994 A1   Jun. 30, 2016

Related U.S. Application Data

(60) Provisional application No. 61/876,789, filed on Sep. 12, 2013.

(51) Int. Cl.
*F23R 3/06* (2006.01)
*F23M 5/08* (2006.01)
(Continued)

(52) U.S. Cl.
CPC ............ *F23M 5/085* (2013.01); *F23R 3/002* (2013.01); *F23R 3/06* (2013.01); *F23R 3/60* (2013.01);
(Continued)

(58) Field of Classification Search
CPC .... F23R 3/06; F23R 3/002; F23R 3/60; F23R 2900/03044; F23M 5/085
See application file for complete search history.

(56) References Cited

U.S. PATENT DOCUMENTS 4,653,279 A   3/1987  Reynolds
4,944,151 A   7/1990  Hovnanian
(Continued)

FOREIGN PATENT DOCUMENTS

GB        2353589 A  *  2/2001  ............. F23R 3/002

OTHER PUBLICATIONS

International Preliminary Report on Patentability for International Application No. PCT/US2014/049845 dated Mar. 24, 2016.
(Continued)

*Primary Examiner* — Ehud Gartenberg
*Assistant Examiner* — Thomas P Burke
(74) *Attorney, Agent, or Firm* — Carlson, Gaskey & Olds, P.C.

(57) ABSTRACT

A combustor for use in a gas turbine engine has a combustor outer shell. A panel has an inner face which will face hot products of combustion, and a boss surrounding a feature, with the boss extending to an outer end. A spacing surface is spaced from the boss, and is at an outer position that is inward of the outer end of the boss. The spacing surface spaces the panel from the outer shell. A trough is intermediate the boss and the spacing surface. The trough extends to an outer end which is inward of the outer position of the spacing surface. A gas turbine engine is also disclosed.

4 Claims, 3 Drawing Sheets

(51) Int. Cl.
  *F23R 3/60* (2006.01)
  *F23R 3/00* (2006.01)
(52) U.S. Cl.
  CPC ... *F23R 2900/03044* (2013.01); *Y02T 50/675* (2013.01)

(56) References Cited

U.S. PATENT DOCUMENTS

| | | | |
|---|---|---|---|
| 7,770,397 B2 | 8/2010 | Patel et al. | |
| 8,418,470 B2 | 4/2013 | Burd | |
| 2003/0213249 A1* | 11/2003 | Pacheco-Tougas | F23R 3/002 60/752 |
| 2003/0213250 A1 | 11/2003 | Pacheco-Tougas et al. | |
| 2004/0006995 A1 | 1/2004 | Snyder | |
| 2004/0104538 A1* | 6/2004 | Pidcock | F23R 3/002 277/549 |
| 2005/0022531 A1* | 2/2005 | Burd | F23R 3/002 60/752 |
| 2008/0264064 A1 | 10/2008 | Sze et al. | |
| 2010/0212324 A1 | 8/2010 | Bronson et al. | |
| 2011/0023495 A1* | 2/2011 | Bronson | F23R 3/06 60/752 |
| 2013/0019603 A1 | 1/2013 | Dierberger | |
| 2013/0031908 A1 | 2/2013 | DiCintio et al. | |

OTHER PUBLICATIONS

Supplementary European Search Report for European Application No. 14844542.2 dated Sep. 22, 2016.
International Search Report from corresponding PCT/US14/49845.

* cited by examiner

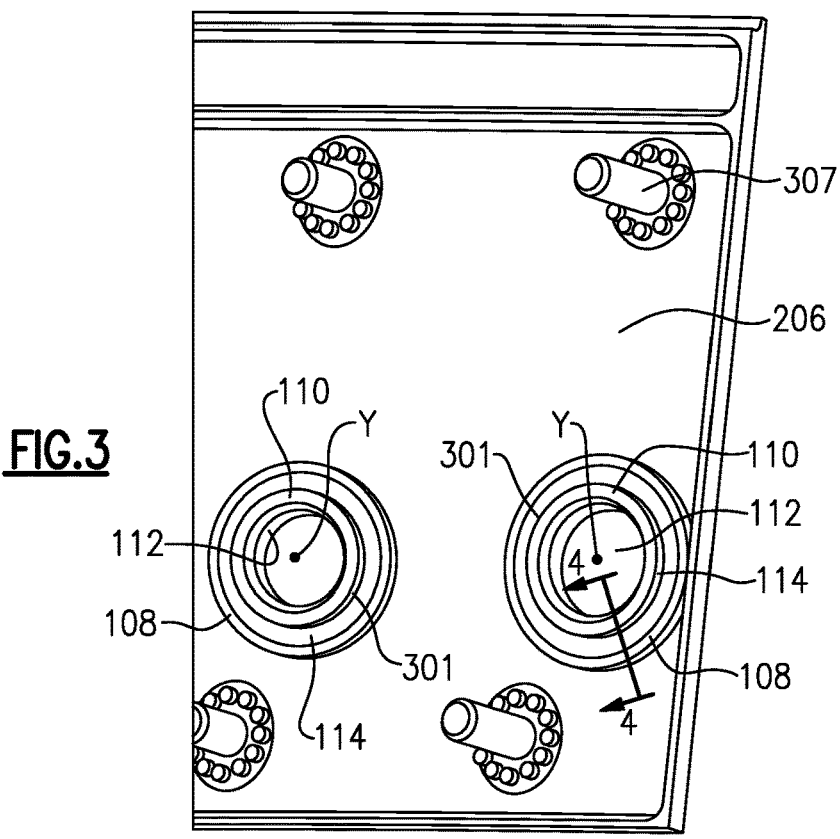
FIG.3
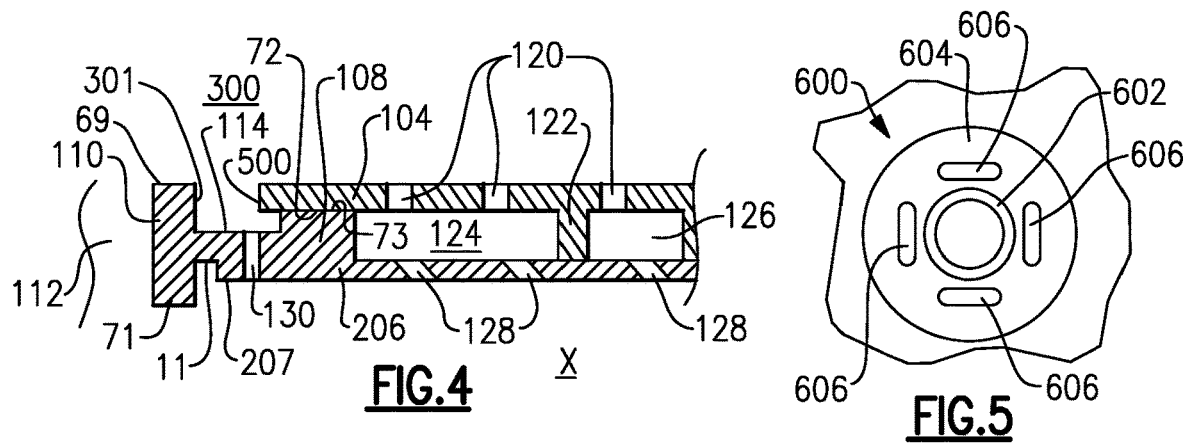
FIG.4
FIG.5
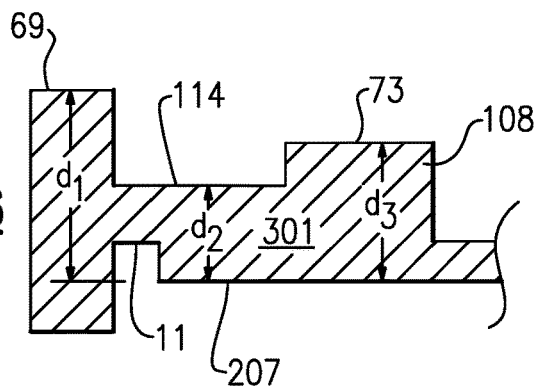
FIG.6
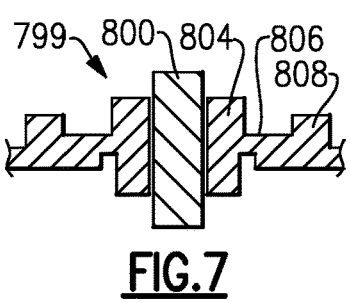
FIG.7

BOSS FOR COMBUSTOR PANEL

CROSS-REFERENCE TO RELATED APPLICATION

This application claims priority to U.S. Provisional Application No. 61/876,789, filed Sep. 12, 2013

BACKGROUND

This application relates to an improvement in bosses utilized in combustion panels for gas turbine engines.

Gas turbine engines are known and, typically, include a fan delivering air into a compressor. The air is compressed and delivered into a combustion section. The air is mixed with fuel in the combustion section and ignited. Products of the combustion pass downstream over turbine rotors driving them to rotate.

As should be apparent, very high temperatures are experienced within the combustor section. Thus, combustor liners are utilized to face the hot products of combustion and protect the overall combustor shell.

The combustor liners are supplied with cooling air including dilution passages which deliver a high volume of cooling air into a hot flow path.

Dilution passages include a boss which extends beyond a hot side face of the liner.

Other features in the combustor may have liners with bosses. It becomes difficult to cool the bosses.

SUMMARY

In a featured embodiment, a combustor for use in a gas turbine engine has a combustor outer shell. A panel has an inner face which will face hot products of combustion. A boss surrounds a feature with the boss extending to an outer end. A spacing surface is spaced from the boss, with the spacing surface at an outer position that is inward of the outer end of the boss, the spacing surface spacing the panel from the outer shell. A trough is intermediate the boss and the spacing surface. The trough extends to an outer end which is inward of the outer position of the spacing surface.

In another embodiment according to the previous embodiment, the trough surrounds a boss central axis about 360 degrees.

In another embodiment according to any of the previous embodiments, at least one cooling hole extends through the trough to provide cooling air to the inner face of the panel.

In another embodiment according to any of the previous embodiments, cooling cavities are formed spaced from the spacing surface in a direction away from the boss Impingement holes are included in the outer shell for directing cooling air to the cooling cavities.

In another embodiment according to any of the previous embodiments, impingement holes extend through the outer shell into the cooling cavities, and panel holes extend from the cooling cavities through the panel.

In another embodiment according to any of the previous embodiments, the spacing surface provides a seal between the panel and the outer shell.

In another embodiment according to any of the previous embodiments, the trough is provided by a plurality of localized portions.

In another embodiment according to any of the previous embodiments, the spacing surface provides a seal between the panel and the outer shell.

In another embodiment according to any of the previous embodiments, cooling cavities are formed spaced from the spacing surface in a direction away from the boss. Impingement holes are included in the outer shell for directing cooling air to the cooling cavities.

In another embodiment according to any of the previous embodiments, at least one cooling hole extends through the trough to provide cooling air to the inner face of the panel.

In another embodiment according to any of the previous embodiments, the feature is a dilution passage.

In another embodiment according to any of the previous embodiments, the feature is an ignitor.

In another embodiment according to any of the previous embodiments, the feature is a fuel nozzle.

In another embodiment according to any of the previous embodiments, the trough is provided by a plurality of localized portions.

In another embodiment according to any of the previous embodiments, a first distance is defined perpendicular to an extension of the inner face, and to the outer end of the boss. A second distance is defined perpendicular to the inner face, and to the outer end of the trough. A ratio of the first distance to the second distance is between 4.5 and 2.0.

In another embodiment according to any of the previous embodiments, a third distance is defined perpendicular to the inner face, and to the outer position of the spacing surface. A ratio of the second distance to the third distance being between 0.77 and 0.33.

In another embodiment according to any of the previous embodiments, a second distance is defined perpendicular to the inner face, and to the outer end of the trough. A third distance is defined perpendicular to the inner face, and to the outer position of the spacing surface. A ratio of the second distance to the third distance being between 0.77 and 0.33.

In another featured embodiment, a gas turbine engine has a compressor, a combustor and a turbine. The combustor includes an outer shell. A panel has an inner face which will face hot products of combustion. A boss surrounds a feature with the boss extending to an outer end. A spacing surface is spaced from the boss, with the spacing surface at an outer position that is inward of the outer end of the boss. The spacing surface spaces the panel from the outer shell. A trough is intermediate the boss and the spacing surface, and extends to an outer distance which is inward of the outer position of the spacing surface.

In another embodiment according to the previous embodiment, the trough surrounds a boss central axis about 360 degrees.

In another embodiment according to any of the previous embodiments, the trough is provided by a plurality of localized portions.

These and other features may be best understood from the following drawings and specification.

BRIEF DESCRIPTION OF THE DRAWINGS

FIG. 3 shows a detail of an improved combustor panel.

FIG. 4 is a cross-sectional view through a portion of the FIG. 3 panel.

FIG. 5 shows an alternative embodiment.
FIG. 6 shows detail of FIGS. 4 and 5.
FIG. 7 shows an alternative embodiment.

DETAILED DESCRIPTION

Figure 1:
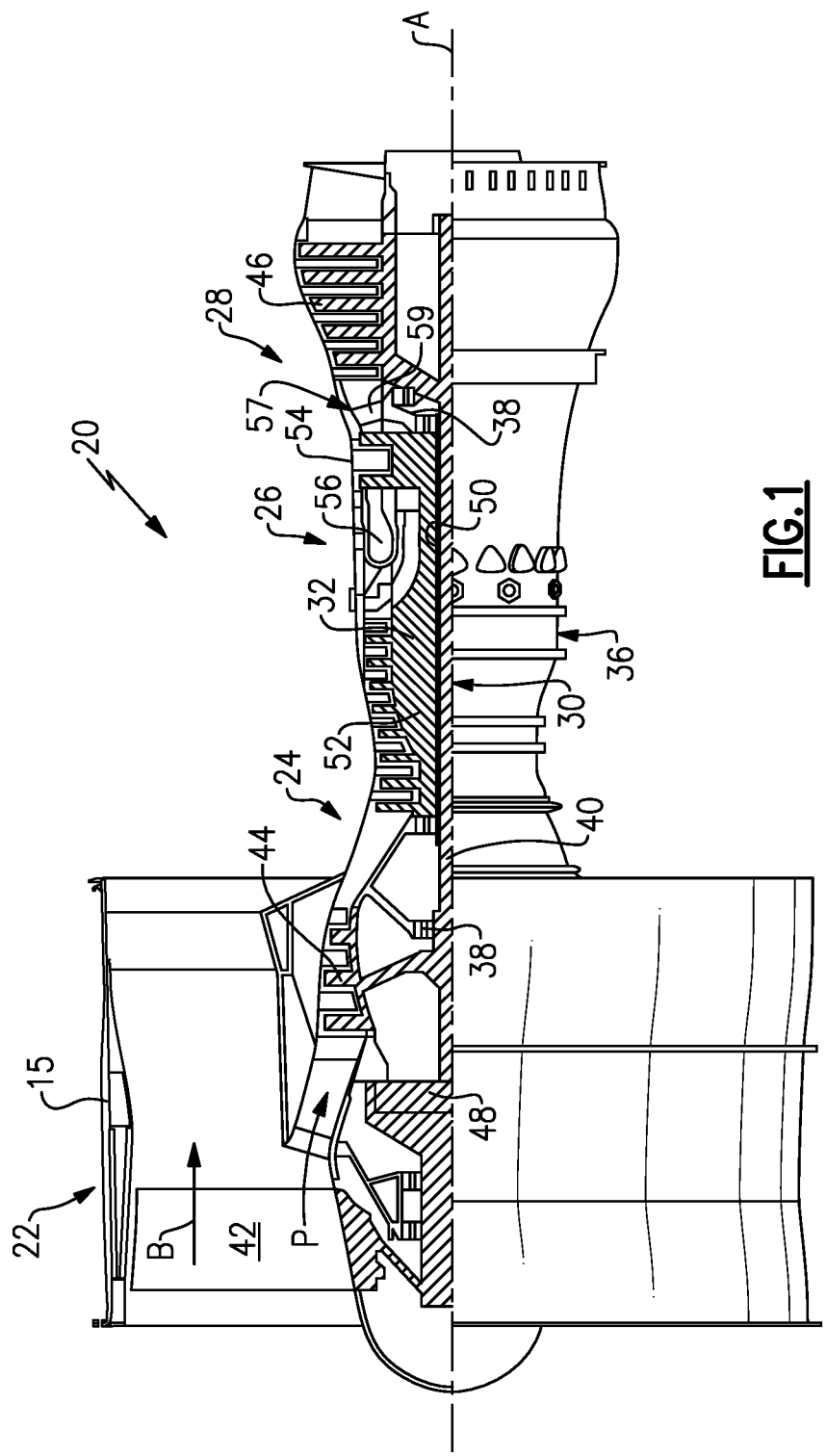
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path P for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path P. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second.

Figure 2A:
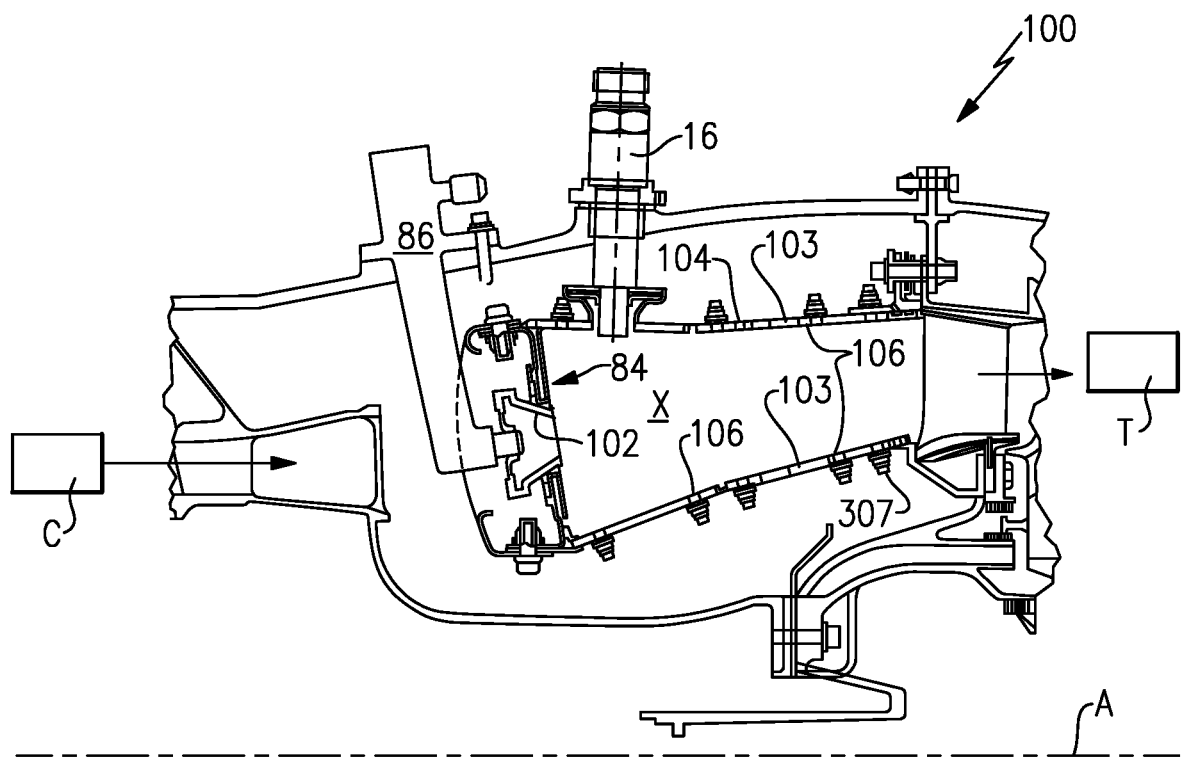
FIG. 2A shows a combustor

FIG. 2A shows a combustor 100, which may be utilized in an engine such as engine 20 of FIG. 1. An outer shell 104 defines a combustion chamber X. A swirler 102 mixes air and fuel which is ignited within the combustor 100. A plurality of inner panels 106 are connected by studs 307 to the outer shell 104. Dilution passages 103 allow the flow of cooling air into an inner face of the panels 106. Further, an ignitor 16 extends through the outer shell 104, as does fuel nozzle 86. For purposes of this application, the term "inner" means facing the chamber X. The relative term "outer" is facing spaced away from the chamber.

Air travels to combustor 100 from a compressor C. Gases pass from combustor 100 to a turbine T.

Figure 2B:
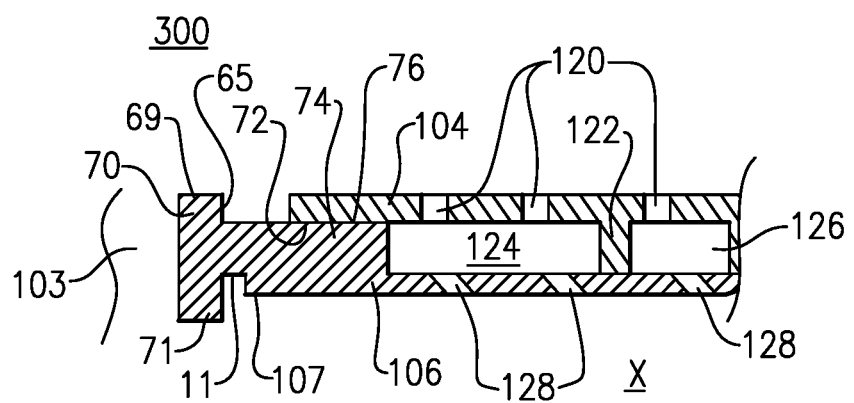
FIG. 2B shows a portion of a known combustor liner.

FIG. 2B shows the outer shell 104 and a portion of inner panel 106. As shown, a dilution passage 103 has a boss 70 extending between an outer end 69 and an inner end 71. The panel 106 has an inner face 107 facing the hot products of combustion in chamber X.

Cooling cavities 124 and 126 are provided spaced from a sealing area 74 which has an upper contact surface 76 which is spaced inwardly from the boss outer end 69. The cooling cavities 124/126 are spaced from the sealing area 74 in a direction away from the boss 70. As can be seen, the surface 76 seals against an inner surface 72 of the outer shell 104. This seals an area 300 from the cavities 124/126. Air is injected into cooling cavities 124/126 through impingement holes 120 and then through panel holes 128 in the inner panel 106 to provide film cooling along an inner face 107 of the inner panel 106. Ribs 122 may separate the cavities 124 and 126.

With the arrangement as shown, having a single surface 76 extending from an peripheral surface 65 of the boss 70 to a location which contacts the inner surface 72, there is a relatively thick amount of material across the sealing area 74. This becomes difficult to cool and can result in some distress at inner face 107. A ditch 11 extends inwardly at inner face 107 and about peripheral surface 65.

FIG. 3 shows an inner panel 206. In inner panel 206, the dilution passage 112 is provided with a boss 110. Further, there is a sealing area 108 having an outer position defining a surface 73 that contacts the inner surface 72 of the outer shell 104. However, there is a trough 114 between an peripheral surface 301 of the boss 110 and the sealing area 108. As can be seen, trough 114 surrounds a center axis Y of dilution passage 112 about 360 degrees.

As shown in FIG. 4, the trough 114 is positioned between a peripheral surface 301 of the boss 110 and a thicker sealing area 108 that provides the sealing surface 73, in contact with surface 72 of the outer shell 104. The area 108 also spaces the outer shell 104 relative to inner panel 206. The sealing surface 73 serves to separate the area 300 from the cooling cavities 124 and 126 as in the FIG. 2B embodiment. The impingement holes 120 operate to deliver air into the cooling cavities 124/126, and then to the inner face 207 through panel holes 128 as in the prior embodiment. The cooling cavities 124/126 are spaced from the sealing area 74 in a direction away from the boss 110.

As can be appreciated, the impingement holes 120 are generally perpendicular to the inner face 207, while the panel holes 128 extend at a non-perpendicular and non-parallel angle such that film cooling air is better distributed along the inner face 207.

By thinning the sealing area 108 intermediate the outer surface 301 of the boss 110 and the sealing surface 73, it becomes easier to cool the inner face 207. That is, since the material is thinner, cooling air supplied into the trough 114 is better able to cool the inner face 207 than in the FIG. 2B embodiment. As can also be seen an outer extent 500 of outer shell 104 is spaced away from the outer surface 301 of the boss 110 such that at least a portion of an area of the trough 114 is not covered by the outer shell 104.

In addition, a cooling hole 130 may extend through the trough 114 to provide additional cooling to the inner face 207. The cooling hole 130 may be perpendicular or non-perpendicular to the inner face 207.

As can be appreciated from FIG. 4, the inner end 71 of the boss 70 extends inwardly beyond the inner face 207. As further shown in FIG. 3, there are a plurality of dilution passages 112 each provided with the trough 114 and sealing area 108.

A second embodiment 600 is illustrated in FIG. 5, wherein the boss 602 is surrounded by the sealing surface 604. Rather than have the trough extend entirely for 360 degrees, the trough is provided by a plurality of localized portions 606 may be positioned at "hot spots," as may be determined.

FIG. 6 shows geometrically the relationship of the boss 110 outer end 69, the trough 114, and the sealing surface 73. As shown, the inner face 207 can be extended such that a distance $d_1$ perpendicular to, and from an extension of the inner face 207, measured to the outer end 69 can be defined. A distance $d_2$ from the inner face 207 perpendicular to an outer position at the surface of the trough 114 is defined, and a distance $d_3$ from the inner face 207 to the outer position at the surface 73 can be defined. A ratio of $d_1$ to $d_2$ is nominally between 4.5 and 2.0, and a ratio of $d_2$ to $d_3$ may be between 0.77 and 0.33. Taking tolerances into account, the ratio of d1 to d2 is 5.5-1.85 and a ratio of d2 to d3 is 0.85-0.25. These relationships would also extend to the FIG. 5 embodiment.

Stated another way, a panel 206 has an inner face 207 which will face hot products of combustion, and a feature disclosed as dilution passage 112. A boss 110 surrounds the dilution passage 112 and extends to an outer end 69. A sealing surface 73 is spaced from the boss 110, and extends to an outer end that is inward of the outer end 69 of the boss 110. A thinner portion of the panel 206 is formed by a trough 114 intermediate the boss 110 and the sealing surface 73. The trough 114 extends to an outer distance that is less than the outer distance of the sealing surface 73. The trough 114 may surround a hole, or boss, central axis Y about 360 degrees.

While the surface 73 is disclosed as a sealing surface, in embodiments, the surface 73 may simply be a spacing surface spacing the panel from the outer shell. Even in the embodiments shown in FIGS. 4 and 5, the surfaces 73/604 need not provide a seal, and some leakage may be allowed.

This application would extend to any inner panel having a boss around a feature, and a spacing surface for spacing the inner panel from the outside shell. While the feature is disclosed as a dilution passage, other features may have a boss. As an example, a boss may be provided around the ignitor 16, or the fuel nozzle 86, or any number of other features within the combustor as shown in FIG. 2A. Those bosses would also benefit from the trough as disclosed in this application.

As shown in FIG. 7, a panel 799 has a boss 804 with a trough 806, and a sealing surface 808. The boss 804 surrounds the feature 800, which may be an ignitor or a fuel nozzle, or any number of other features within the combustor which would include a boss and an associated panel 799.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A combustor for use in a gas turbine engine comprising:
   a combustor outer shell;
   a panel having an inner face which will face hot products of combustion, and a boss for surrounding a feature, with said boss extending to an outer end;
   a spacing surface spaced from said boss, with said spacing surface at an outer position that is inward of said outer end of said boss, said spacing surface spacing said panel from said combustor outer shell;
   a trough intermediate said boss and said spacing surface and said trough extending to a trough outer end which is inward of said outer position of said spacing surface; and
   a first distance is defined perpendicular to an extension of said inner face, and to said outer end of said boss, and a second distance is defined perpendicular to said inner face, and to said outer end of said trough, and a ratio of said first distance to said second distance is between 4.5 and 2.0.

2. The combustor as set forth in claim 1, wherein a third distance is defined perpendicular to said inner face, and to said outer position of said spacing surface, and a ratio of said second distance to said third distance being between 0.77 and 0.33.

3. A combustor for use in a gas turbine engine comprising:
a combustor outer shell;
a panel having an inner face which will face hot products of combustion, and a boss for surrounding a feature, with said boss extending to an outer end;
a spacing surface spaced from said boss, with said spacing surface at an outer position that is inward of said outer end of said boss, said spacing surface spacing said panel from said combustor outer shell;
a trough intermediate said boss and said spacing surface and said trough extending to a trough outer end which is inward of said outer position of said spacing surface;
wherein said trough surrounds a boss central axis about 360 degrees;
wherein cooling cavities are formed spaced from said spacing surface in a direction away from said boss, and impingement holes are included in said combustor outer shell for directing cooling air to said cooling cavities and said cooling cavities are sealed from said trough, and sealed by said spacing surface;
wherein said impingement holes extend through said combustor outer shell into said cooling cavities, and panel holes extend from said cooling cavities through said panel;
wherein said spacing surface provides a seal between said panel and said combustor outer shell; and
wherein a second distance is defined perpendicular to said inner face, and to said outer end of said trough, and a third distance is defined perpendicular to said inner face, and to said outer position of said spacing surface, and a ratio of said second distance to said third distance being between 0.77 and 0.33.

4. A combustor for use in a gas turbine engine comprising:
a combustor outer shell;
a panel having an inner face which will face hot products of combustion, and a boss for surrounding a feature, with said boss extending to an outer end;
a spacing surface spaced from said boss, with said spacing surface at an outer position that is inward of said outer end of said boss, said spacing surface spacing said panel from said combustor outer shell;
a trough intermediate said boss and said spacing surface and said trough extending to a trough outer end which is inward of said outer position of said spacing surface;
wherein said trough surrounds a boss central axis about 360 degrees;
wherein cooling cavities are formed spaced from said spacing surface in a direction away from said boss, and impingement holes are included in said combustor outer shell for directing cooling air to said cooling cavities and said cooling cavities are sealed from said trough, and sealed by said spacing surface;
wherein said impingement holes extend through said combustor outer shell into said cooling cavities, and panel holes extend from said cooling cavities through said panel;
wherein said spacing surface provides a seal between said panel and said combustor outer shell; and
wherein an outer extent of said combustor outer shell is spaced away from an outer surface of the boss such that at least a portion of an area of said trough is not covered by the combustor outer shell.

\* \* \* \* \*